(12) United States Patent
Sawada et al.

(10) Patent No.: US 7,019,396 B2
(45) Date of Patent: Mar. 28, 2006

(54) ELECTRONIC CHIP COMPONENT AND METHOD FOR MANUFACTURING ELECTRONIC CHIP COMPONENT

(75) Inventors: Takashi Sawada, Sabae (JP); Shigekatsu Yamamoto, Takefu (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 10/882,276

(22) Filed: Jul. 2, 2004

(65) Prior Publication Data
US 2005/0012200 A1    Jan. 20, 2005

(30) Foreign Application Priority Data
Jul. 15, 2003    (JP)    ............... 2003-196948

(51) Int. Cl.
| | |
|---|---|
| H01L 23/34 | (2006.01) |
| H01L 23/04 | (2006.01) |
| H01L 23/48 | (2006.01) |
| H01L 23/52 | (2006.01) |

(52) U.S. Cl. ............ 257/724; 257/730; 257/736; 257/750

(58) Field of Classification Search ........... 257/736, 257/750, 724, 730
See application file for complete search history.

(56) References Cited

U.S. PATENT DOCUMENTS

| 4,617,609 A | * | 10/1986 | Utner et al. ............ 361/310 |
| 5,498,906 A | * | 3/1996 | Roane et al. ............ 257/724 |
| 6,548,437 B1 | * | 4/2003 | Sato et al. ............ 501/139 |
| 6,853,074 B1 | * | 2/2005 | Kitae et al. ............ 257/730 |
| 2001/0026017 A1 | * | 10/2001 | Seto ............ 257/736 |
| 2002/0020896 A1 | * | 2/2002 | Ishikawa et al. ............ 257/622 |

FOREIGN PATENT DOCUMENTS

JP    11-283866    10/1999

* cited by examiner

*Primary Examiner*—Nitin Parekh
(74) *Attorney, Agent, or Firm*—Keating & Bennett, LLP

(57) ABSTRACT

An electronic chip component includes a component body and a plurality of terminal electrodes disposed on outer surfaces of the component body. At least one of the terminal electrodes includes a cured resin film including dispersed conductive particles, an outer conductive film formed on the cured resin film by electroplating, and additional conductive metallic particles being dispersed on an interface between the cured resin film and the outer conductive film.

14 Claims, 7 Drawing Sheets

US 7,019,396 B2

ELECTRONIC CHIP COMPONENT AND METHOD FOR MANUFACTURING ELECTRONIC CHIP COMPONENT

BACKGROUND OF THE INVENTION

1. Field of the Invention

The present invention relates to electronic chip components and methods for manufacturing electronic chip components, and in particular, to structures of outer electrodes located on outer surfaces of component bodies and methods for forming the outer electrodes.

2. Description of the Related Art

A known method related to the present invention is taught in Japanese Unexamined Patent Application Publication No. 11-283866. In this publication, terminal electrodes are formed on outer surfaces of bodies of chip components by the following steps: resistive films which will form terminal electrodes are formed with a resistive paste containing conductive particles of, for example, Ag, Cu, Au, Ni, Mn, Si, $RuO_2$, SnO, ZnO, $Cu_2O$, CuO, NiO, or TaN, and a curable resin, such as an epoxy resin, acrylic resin, melamine resin, phenolic resin, resol-type phenolic resin, unsaturated polyester resin, fluorocarbon resin, or silicone resin, by dipping, for example; the resistive films are cured; and Ni layers, and Sn layers or Sn—Pb alloy layers are optionally formed on the resistive films by plating. Capacitor-resistor (CR) composite components with an equivalent series resistance (ESR) ranging from 1 mΩ to 2,000 mΩ, which have sufficient capacitance functioning as the power-supply bypass capacitance of power-supply circuits, can be fabricated by adopting the structure as described above.

In general, the above-described chip components are formed on wiring boards by soldering. Thus, terminal electrodes having good solderability are required. In general, the terminal electrodes are plated in advance with metals having high wettability to satisfy this requirement.

However, as described above, it is difficult to apply electroplating when the resistance value of the resistive films which will form the terminal electrodes is high. When the volume resistivity of the resistive films equals or exceeds approximately $5\times10^{-3}$ Ω·m, it is difficult to apply electroplating. Thus, in practice, it is difficult to form metal-plated films having good wettability on the resistive films.

Instead of electroplating, non-electroplating or dry plating, for example, can be applied. In this case, however, additional steps such as covering the surfaces of component bodies with a resin are required so that plating films are deposited only on regions of the surfaces where terminal electrodes are to be formed.

SUMMARY OF THE INVENTION

In order to overcome the problems described above, preferred embodiments of the present invention provide an electronic chip component and a method for manufacturing the electronic chip component in which the above-described problems can be solved.

An electronic chip component according to a preferred embodiment of the present invention includes a chip component body and a plurality of terminal electrodes disposed on outer surfaces of the component body, at least one of the terminal electrodes including a cured resin film having dispersed conductive particles, an outer conductive film formed on the cured resin film by electroplating, and conductive metallic particles dispersed on an interface between the cured resin film and the outer conductive film.

The conductive metallic particles are arranged to enlarge a contact area between the resin film and the outer conductive film. Thus, the resin film tightly adheres to the outer conductive film to increase the strength of the terminal electrodes.

It is preferable that the above-described resin film be a resistive film. In this case, the electronic chip component according to a preferred embodiment of the present invention can be a composite component provided with a resistive element.

In this preferred embodiment, when the component body includes a plurality of stacked insulating layers and at least one inner electrode pair including a first inner electrode and a second inner electrode disposed alternately, each of the inner electrodes being disposed between the two adjacent insulating layers and both of the inner electrodes opposing each other with one of the insulating layers therebetween, to provide electrostatic capacitance, and the terminal electrodes include a first terminal electrode electrically connected to the first inner electrode and second terminal electrodes electrically connected to the second inner electrode, the electronic chip component can be a CR composite component.

In this case, when the first terminal electrode is preferably a ground terminal electrode and the second terminal electrodes are preferably two input-output terminal electrodes, the electronic chip component is a three-terminal CR composite component. In the three-terminal CR composite component, the ground terminal electrode includes the resistive film and the outer conductive film.

In such a three-terminal CR composite component, the resistive film defines a portion of the thickness of the ground terminal electrode, and current can be fed in the thickness direction of the resistive film. Thus, inductance caused by the resistive film is reduced, and the three-terminal CR composite component has excellent characteristics in a high-frequency range.

When the terminal electrodes of the above-described electronic chip component include the resistive film and the outer conductive film, it is preferable that a substrate conductive film be formed between the outer surfaces of the component body and the resistive film. The substrate conductive film ensures high conductivity between the terminal electrodes and the inner electrodes in the component body, for example.

The present invention is also applicable to a method for manufacturing the above-described electronic chip component.

A method for manufacturing an electronic chip component according to another preferred embodiment of the present invention includes the steps of preparing a chip component body, preparing paste including a curable resin containing dispersed conductive particles, forming a paste film by depositing the paste on outer surfaces of the component body, depositing conductive metallic particles on the paste film before the paste film is cured, forming a resin film by curing the curable resin contained in the paste film, and forming an outer conductive film on the resin film by electroplating.

In the above-described step of depositing the conductive metallic particles on the paste film, one of the following steps is preferably carried out: the paste film formed on the component body is pushed into a deposit of the conductive metallic particles; the conductive metallic particles are put on a soft plate and the paste film formed on the component body is slid on the soft plate while the paste film is pushed into the soft plate; or the conductive metallic particles are sprayed on the paste film formed on the component body.

In these processes, the conductive metallic particles are easily deposited on the resin film and a surface of the resin film is rendered conductive by the conductive metallic particles before electroplating. Thus, the outer conductive film can be formed on the resin film by electroplating even though the curable resin is contained in the resin film.

These and various other features, elements, steps, characteristics and advantages of the present invention will become more apparent from the following detailed description of preferred embodiments thereof with reference to the attached drawings.

DETAILED DESCRIPTION OF PREFERRED EMBODIMENTS

Figure 1:
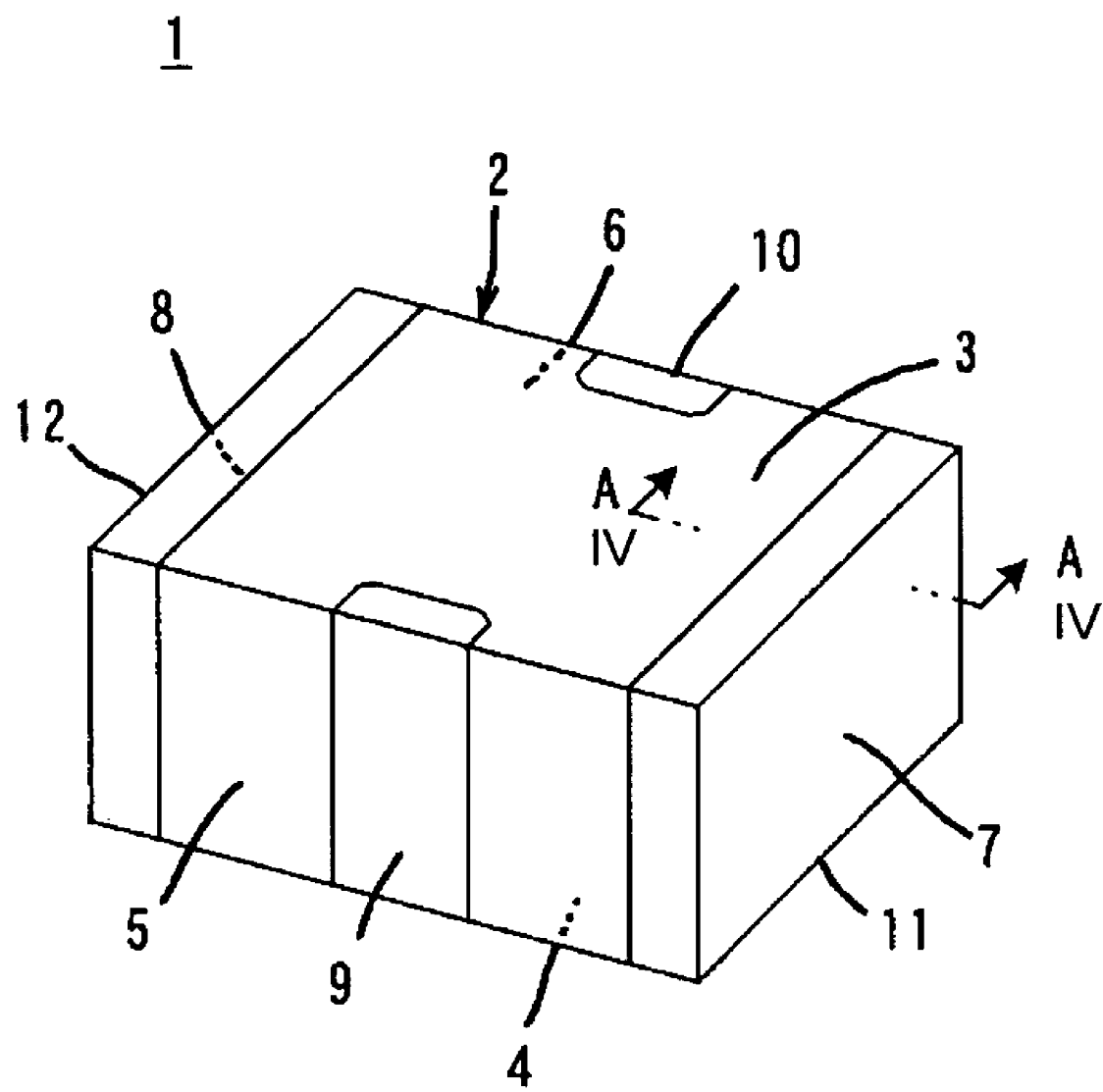
FIG. 1 is a perspective view illustrating the appearance of a three-terminal CR composite component functioning as an electronic chip component according to a preferred embodiment of the present invention.
Figure 2A:
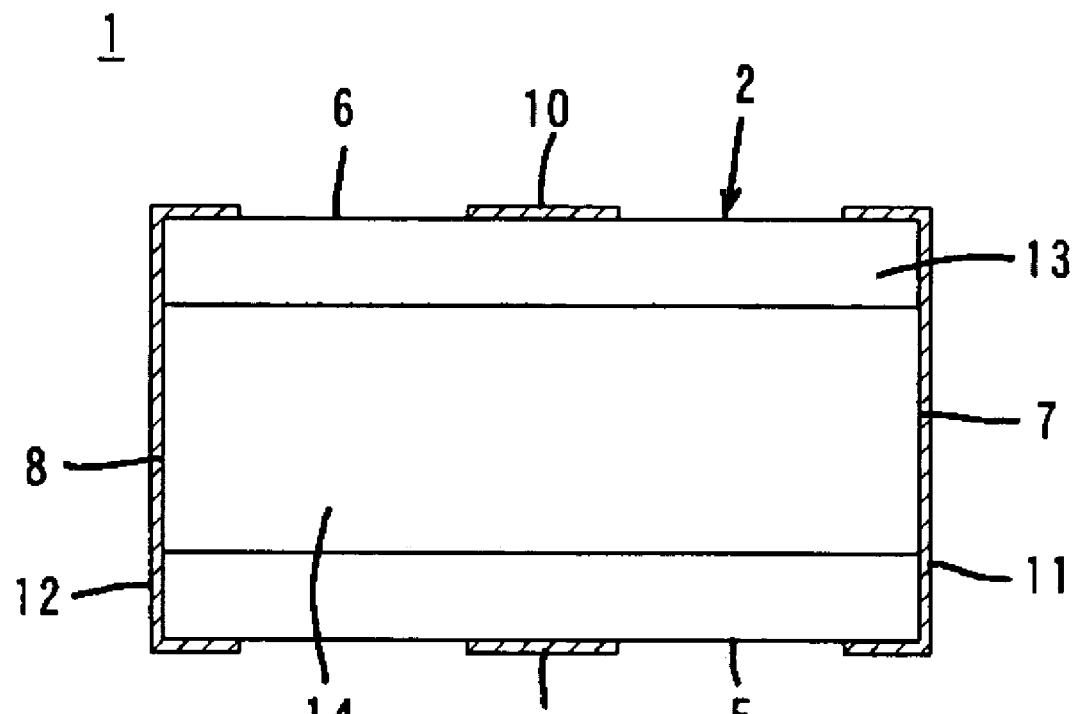
FIGS. 2A and 2B are cross-sectional views illustrating structures of the three-terminal CR composite component shown in FIG. 1, respectively viewed from a cross-section in a plane on which inner ground electrodes are disposed and a cross-section in a plane on which inner signal electrodes are disposed.
Figure 2B:
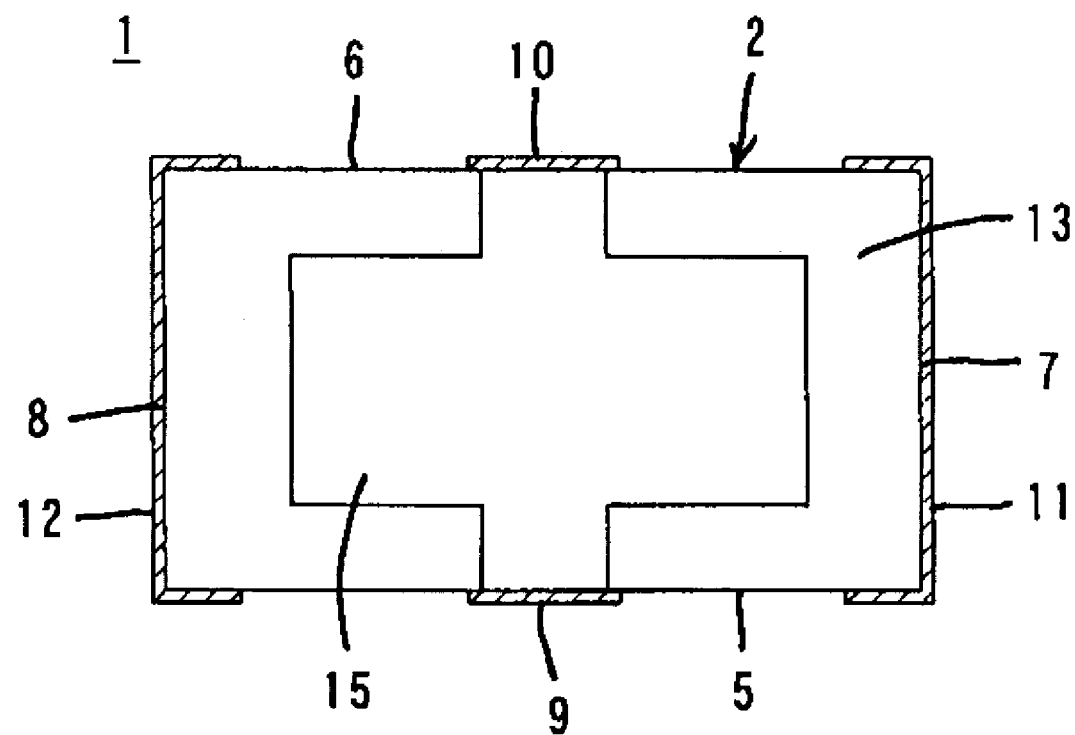
Figure 3:
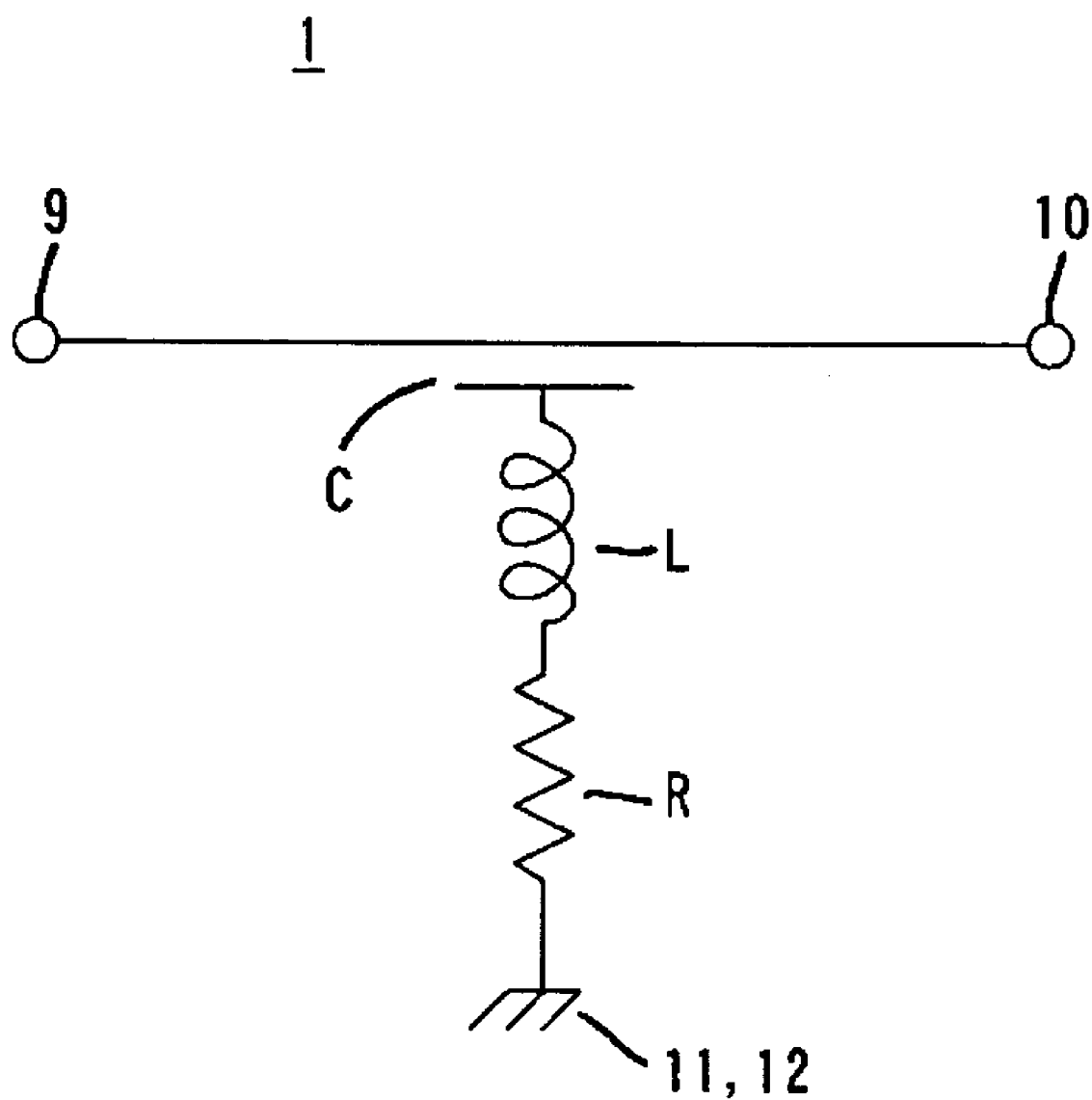
FIG. 3 is an equivalent circuit diagram of the three-terminal CR composite component shown in FIG. 1.
Figure 4:
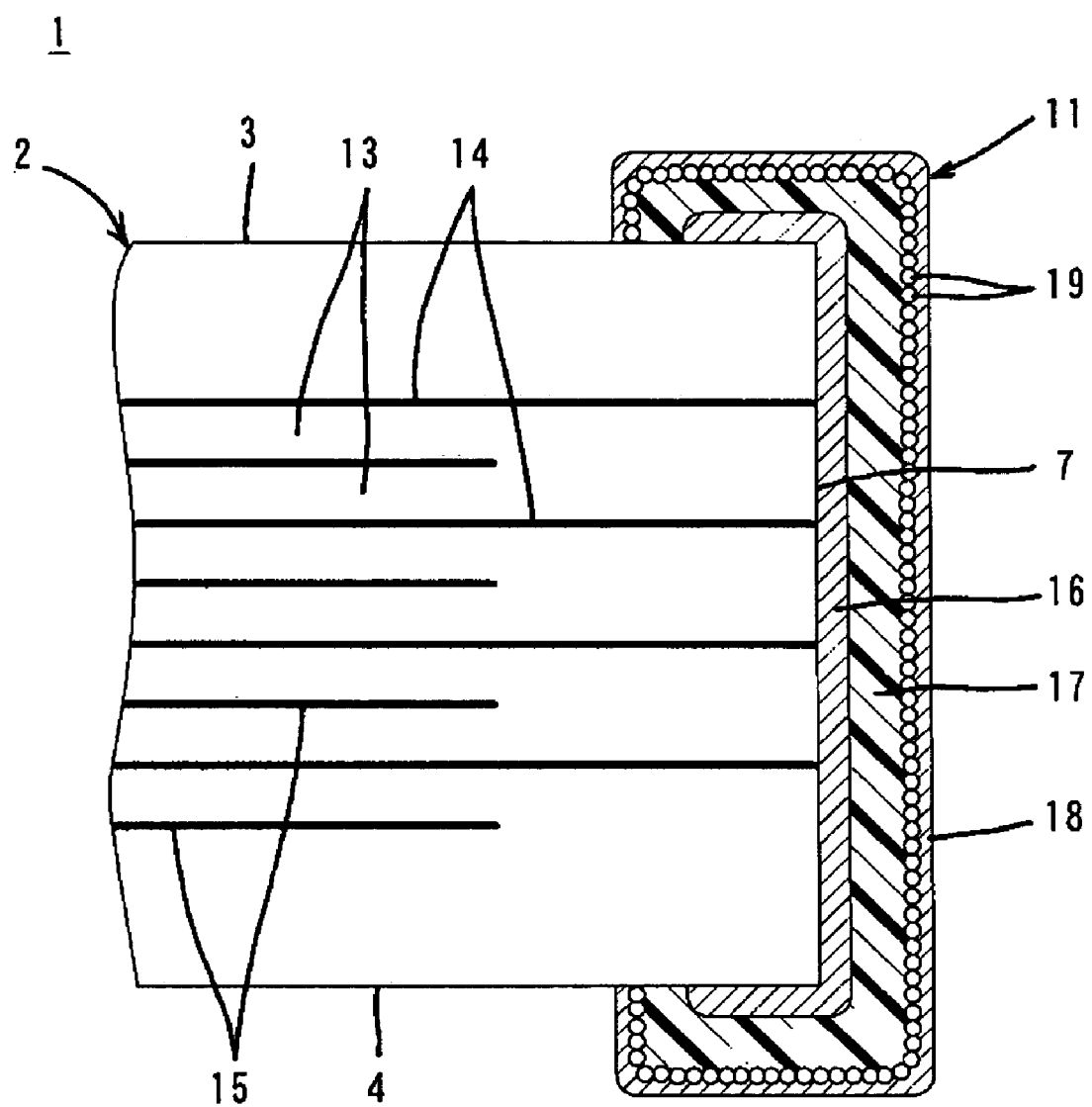
FIG. 4 is a magnified cross-sectional view taken along line IV—IV in FIG. 1.

FIGS. 1 to 4 illustrate a three-terminal CR composite component 1 functioning as an electronic chip component according to a preferred embodiment of the present invention. FIG. 1 is a perspective view illustrating the appearance of the three-terminal CR composite component 1. FIGS. 2A and 2B are cross-sectional views illustrating structures of the three-terminal CR composite component 1 viewed from different cross sections. FIG. 3 is an equivalent circuit diagram of the three-terminal CR composite component 1. FIG. 4 is a magnified cross-sectional view taken along line IV—IV in FIG. 1.

The three-terminal CR composite component 1 preferably includes a chip component body, more specifically, a substantially rectangular-parallelepiped component body 2. The component body 2 includes a pair of main surfaces 3 and 4 defined by dimensions in the longitudinal and lateral directions of the substantially rectangular-parallelepiped component body 2, a pair of side surfaces 5 and 6 defined by dimensions in the longitudinal and thickness directions of the substantially rectangular-parallelepiped component body 2, and a pair of end surfaces 7 and 8 defined by dimensions in the lateral and thickness directions of the substantially rectangular-parallelepiped component body 2.

Two ground terminal electrodes 11 and 12, which are referred to as first terminal electrodes, and two input-output terminal electrodes 9 and 10, which are referred to as second terminal electrodes, are disposed on outer surfaces of the component body 2.

In particular, the ground terminal electrode 11 covers the entire surface of the first end surface 7 of the component body 2, and partially extends over the main surfaces 3 and 4 and over the side surfaces 5 and 6.

The ground terminal electrode 12 covers the entire surface of the second end surface 8 of the component body 2, and partially extends over the main surfaces 3 and 4 and over the side surfaces 5 and 6.

The strip-shaped input-output terminal electrode 9 covers the central region of the first side surface 5 of the component body 2, and partially extends over the main surfaces 3 and 4.

The strip-shaped input-output terminal electrode 10 covers the central region of the second side surface 6 of the component body 2, and partially extends over the main surfaces 3 and 4.

As shown in FIG. 4, the component body 2 has a layered structure including a plurality of insulating layers 13 composed of a dielectric material, for example, a $BaTiO_3$-based ceramic. Within the component body 2, a plurality of inner ground electrodes 14 referred to as first inner electrodes and a plurality of inner signal electrodes 15 referred to as second inner electrodes are disposed between the insulating layers 13. As shown in FIG. 4, the inner ground electrodes 14 and the inner signal electrodes 15 are disposed alternately and opposing each other. These opposing inner ground electrodes 14 and inner signal electrodes 15 define a capacitance element C within the component body 2 shown in FIG. 3.

FIG. 2A illustrates a cross section in a plane on which the above-described inner ground electrodes 14 are disposed, and FIG. 2B illustrates a cross section in a plane on which the above-described inner signal electrodes 15 are disposed.

As shown in FIG. 2A, the inner ground electrodes 14 extend to the end surfaces 7 and 8 of the component body 2 to electrically connect to the ground terminal electrodes 11 and 12 on the end surfaces 7 and 8.

As shown in FIG. 2B, the inner signal electrodes 15 extend to the side surfaces 5 and 6 of the component body 2 to electrically connect to the input-output terminal electrodes 9 and 10 on the side surfaces 5 and 6.

The detailed structure of the ground terminal electrode 11 is shown in FIG. 4. The structure of the ground terminal electrode 12 is preferably substantially identical to that of the ground terminal electrode 11 shown in FIG. 4. The ground terminal electrode 11 will now be described in detail.

The ground terminal electrode 11 includes a substrate conductive film 16 formed on outer surfaces of the component body 2, a resistive film 17, composed of a resin, formed on the substrate conductive film 16, and an outer conductive film 18 formed on the resistive film 17. Conductive metallic particles 19 are dispersed on the interface between the resistive film 17 and the outer conductive film 18. The conductive metallic particles 19 are schematically illustrated regarding the size, the shape, and the number.

The substrate conductive film 16 is formed on the end surfaces 7 and 8 of the component body 2 and may be a thin film deposited with, for example, elemental nickel or a nickel-chromium alloy by sputtering or deposition; the thin film covered with a silver thin film; a thick film composed of baked conductive paste containing nickel, copper, or silver; or a thick film plated with nickel, or both nickel and gold. When the substrate conductive film 16 is the thick film of the conductive paste, the conductive paste can be deposited by dipping.

Paste composed of a curable resin containing dispersed conductive particles, such as carbon particles; and an oxide, such as $SiO_2$, MgO, CaO, or $Al_2O_3$, is prepared to form the resistive film 17. Preferable conductive particles are composed of, for example, carbon, oxidized ruthenium, tantalum nitride, Au, Ag or Ni. More preferable conductive particles are carbon particles that have a small diameter and a high resistance which is not changed by processing. Examples of preferable curable resins include an epoxy resin, acrylic resin, melamine resin, phenolic resin, resol-type phenolic resin, unsaturated polyester resin, fluorocarbon resin, and silicone resin. More preferable curable resins are thermosetting resins such as phenolic resins, polyimide resins, and epoxy resins. An UV-curable resin may also be used. In addition to the carbon particles, conductive metallic powder and one or more oxides, for example, $SiO_2$, MgO, CaO, and $Al_2O_3$, may be added to the paste to adjust the resistance.

Figure 5:
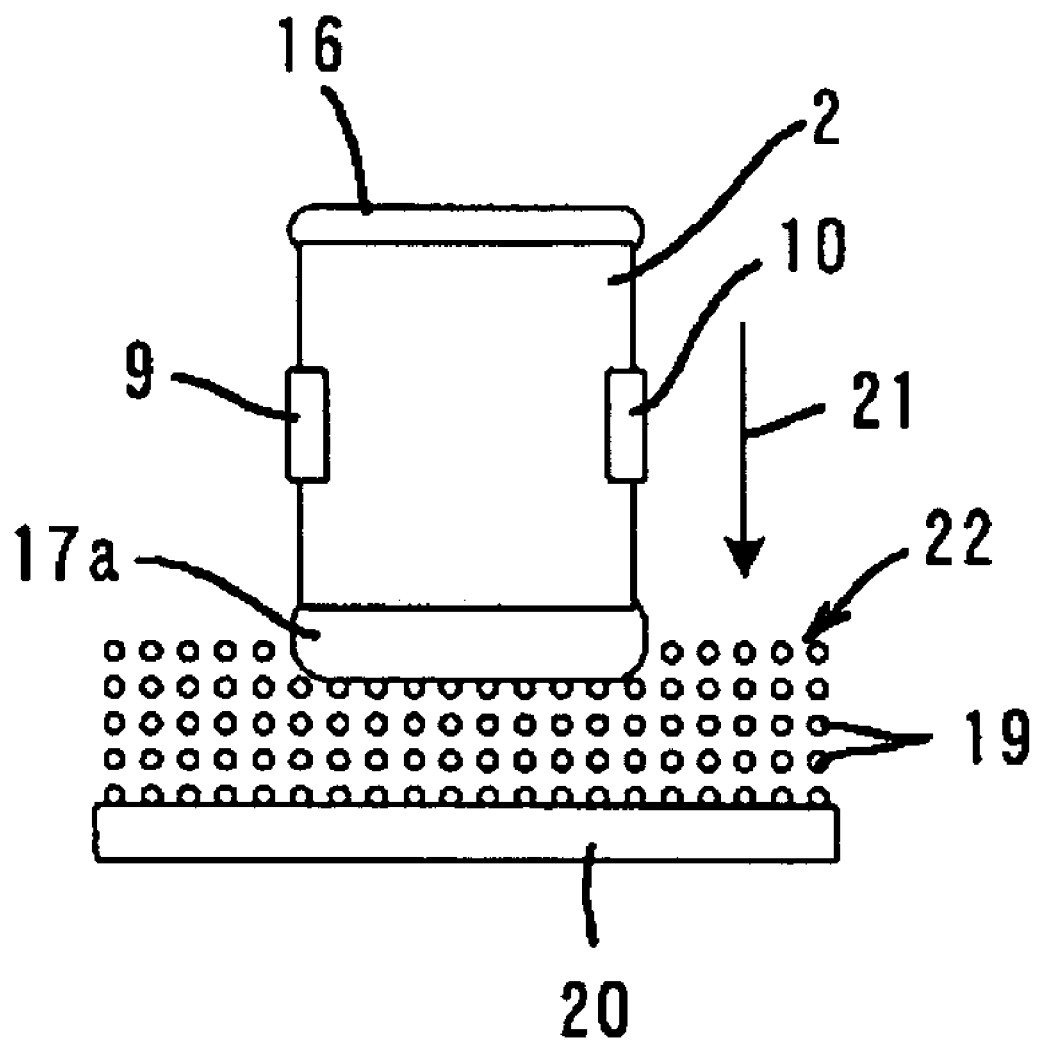
FIG. 5 illustrates a first method for depositing conductive metallic particles on a paste film which will form the resistive film shown in FIG. 4.
Figure 6:
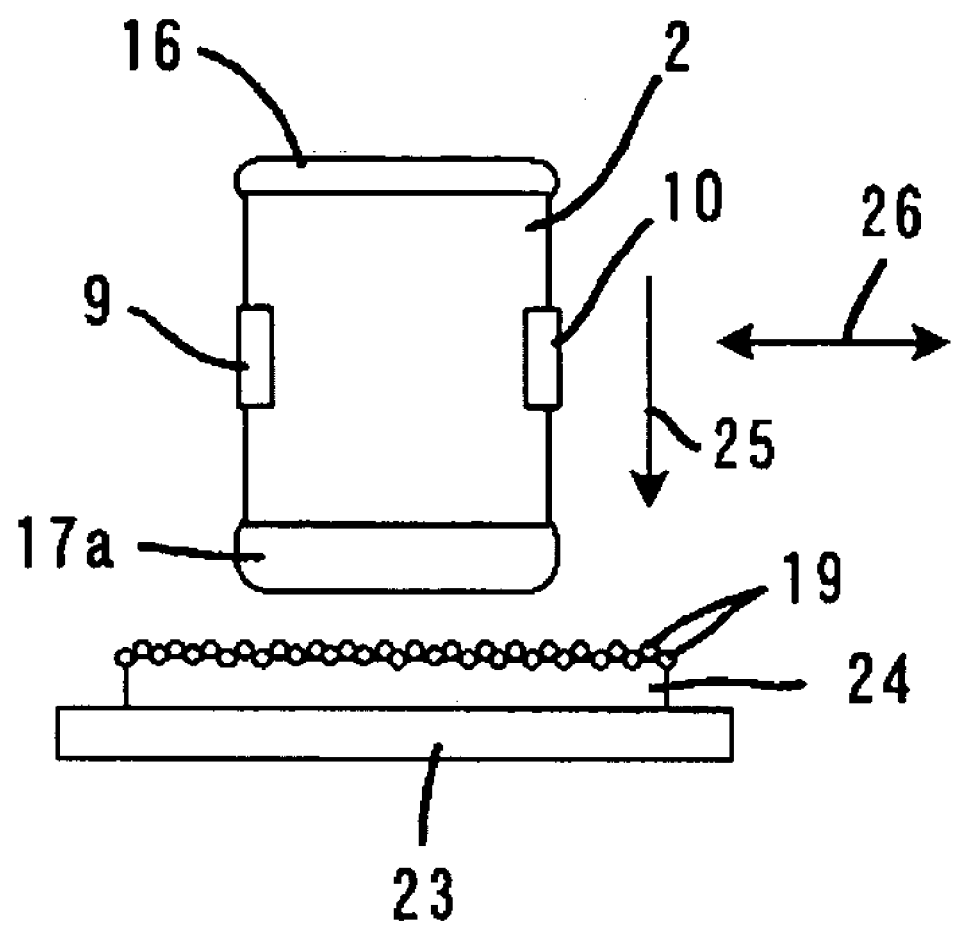
FIG. 6 illustrates a second method for depositing conductive metallic particles on a paste film which will form the resistive film shown in FIG. 4.
Figure 7:
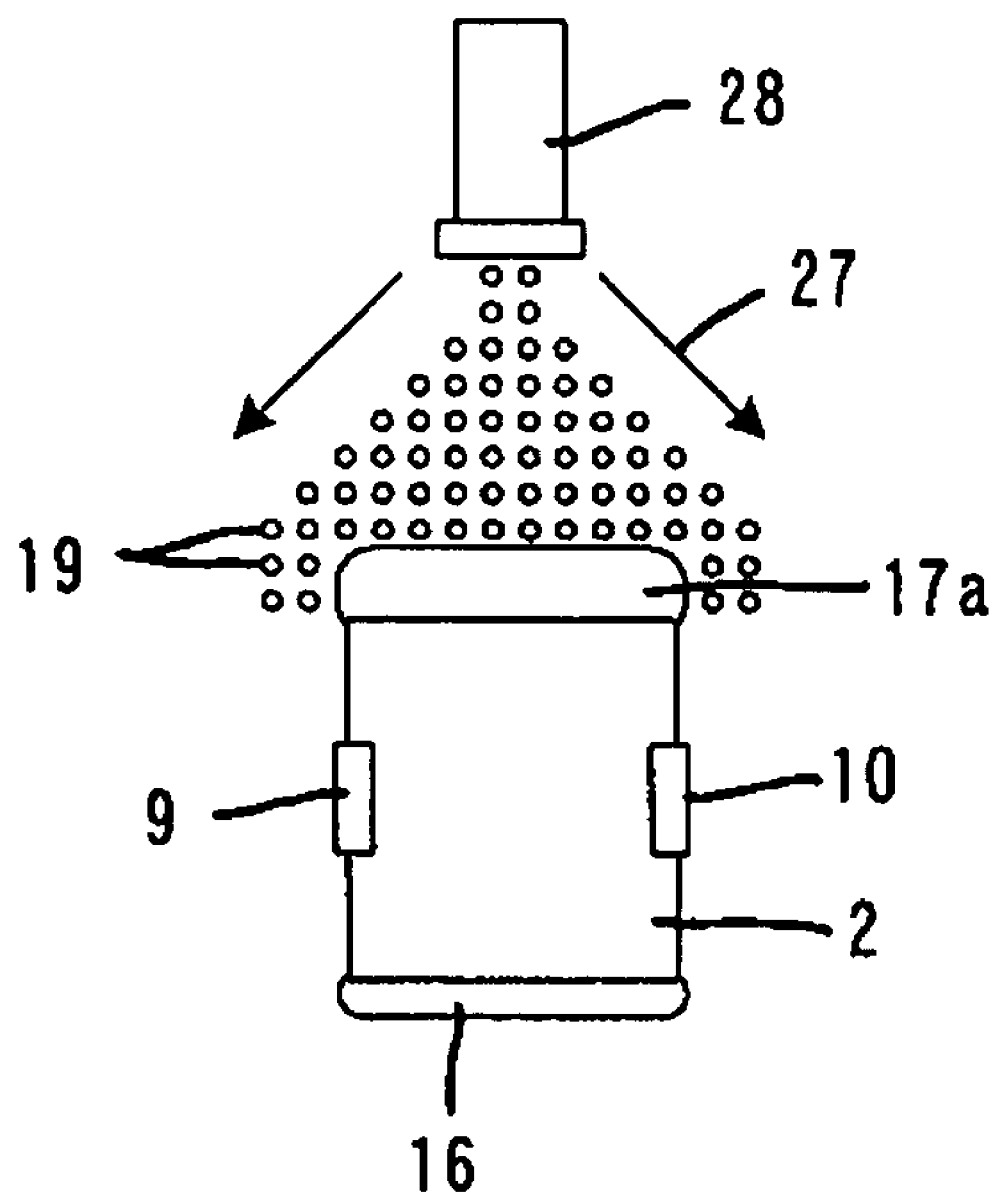
FIG. 7 illustrates a third method for depositing conductive metallic particles on a paste film which will form the resistive film shown in FIG. 4.

The above-described paste is deposited on the outer surfaces of the component body 2, more specifically, on the substrate conductive film 16. The paste is deposited by, for example, dipping. FIGS. 5 to 7 illustrate a paste film 17a which will form the resistive film 17 shown in FIG. 4. The resistive film is formed so that the volume resistivity of the resistive film equals or exceeds approximately $5\times10^{-3}$ Ω·m, depending on the purpose for using the component.

The paste film 17a is cured at a relatively low temperature ranging from about 80° C. to about 120° C. Before the paste film 17a is cured, the conductive metallic particles 19 are deposited on the paste film 17a when the paste film 17a is semi-cured. Conductive metallic particles are preferably composed of oxidation-resistant materials such as Ni, or noble metals including Ag and Au. FIGS. 5 to 7 illustrate typical depositing processes of the conductive metallic particles 19. In FIGS. 5 to 7, the same reference numerals used in FIGS. 1, 2, and 4 are used for elements corresponding to those shown in FIGS. 1, 2, and 4, and duplicated description is omitted.

According to the process shown in FIG. 5, the conductive metallic particles 19 are deposited on a table 20 and a deposit 22 of the conductive metallic particles 19 has a thickness larger than the paste film 17a shown in FIG. 5. The paste film 17a deposited on the component body 2 is pushed into the deposit 22 of the conductive metallic particles 19, as shown by an arrow 21. In this process, the conductive metallic particles 19 can be deposited only on the semi-cured paste film 17a.

According to the process shown in FIG. 6, a soft plate 24 composed of, for example, sponge or rubber is put on a rigid table 23, and the conductive metallic particles 19 are put on the soft plate 24. Then, the paste film 17a deposited on the component body 2 is pushed into the soft plate 24, as shown by an arrow 25. Now, the component body 2 is slid on a surface of the soft plate 24 while the component body 2 is pushed into the soft plate 24, as shown by a double-sided arrow 26. In this process, the conductive metallic particles 19 can be deposited only on the semi-cured paste film 17a.

According to the process shown in FIG. 7, the conductive metallic particles 19 are sprayed on the paste film 17a deposited on the component body 2 from a nozzle 28, as shown by an arrow 27. In this process, the conductive metallic particles 19 can be deposited only on the semi-cured paste film 17a.

In general, the conductive metallic particles 19 deposited by the above-described processes do not form a layered structure on the paste film 17a, but each of the particles is partially pushed into the paste film 17a and dispersed on the paste film 17a.

Next, the curable resin contained in the paste film 17a is cured to form the resistive film 17 composed of the resin. During this process, the conductive metallic particles 19 are adhered to the resistive film 17. In this step for curing the curable resin, when the curable resin is a thermosetting resin, the resin is heated at, for example, a temperature ranging from about 150° C. to about 250° C.

Next, the outer conductive film 18 is formed on the resistive film 17 by electroplating. Since the conductive metallic particles 19 are exposed on the surfaces of the resistive film 17, electroplating can be successfully carried out even though the resistive film 17 has a high resistance.

The outer conductive film 18 may have, for example, a double-layer structure composed of a nickel-plated layer and a tin-plated layer formed on the nickel-plated layer. A copper-plated layer may be optionally provided under the nickel-plated layer.

The ground terminal electrode 12 is also formed by the above-described processes so as to have the same structure as shown in FIG. 4. The explanation and illustration are omitted.

When the ground terminal electrode 11 formed by the above-described processes is provided with the substrate conductive film 16 as shown in FIG. 4, the resistive film 17 should be provided along the entire inner surfaces of the ground terminal electrode 11 while defining a portion of the thickness of the ground terminal electrode 11. That is, the resistive film 17 should cover the entire substrate conductive film 16 so that the outer conductive film 18 formed on the resistive film 17 does not have a direct electrical connection to the substrate conductive film 16. Thus, in the ground terminal electrode 11, current can be fed only in the thickness direction of the resistive film 17. The above description is also applicable to the ground terminal electrode 12.

The substrate conductive film 16 may not necessarily be formed. When the substrate conductive film 16 is not formed and the resistive film 17 is formed directly on the outer surfaces of the component body 2, the resistive film 17 needs to cover only the exposed end edges of the inner ground electrode 14.

The equivalent circuit diagram in FIG. 3 illustrates a resistive element R formed by the above-described resistive film 17 and inductance L inevitably formed by, for example, the resistive film 17, and the inner electrodes 14 and 15. As described above, the current is fed in the thickness direction of the resistive film 17. Thus, the inductance L is reduced. Accordingly, equivalent series inductance of the three-terminal CR composite component 1 can be reduced.

Consequently, the three-terminal CR composite component 1 can achieve large attenuation in a high-frequency range while maintaining a constant insertion loss characteristic in a low-frequency range, thereby effectively reducing noise through a resistor formed by the resistive film 17. A preferable thickness of the resistive film 17 is about 200 μm or less to maintain the small equivalent series inductance of the three-terminal CR composite component 1.

Structures and materials of the input-output terminal electrodes 9 and 10 are preferably substantially identical to those of the ground terminal electrodes 11 and 12, except these input-output terminal electrodes do not include the resistive film 17. Detailed structures of the input-output terminal electrodes 9 and 10 are not illustrated here.

The present invention was illustrated referring to the figures, as above. Additionally, various modifications are possible within the scope of the present invention.

In the above-described preferred embodiments, the ground terminal electrodes 11 and 12 are formed on the end surfaces 7 and 8, respectively, of the component body 2, and the input-output terminal electrodes 9 and 10 are formed on the central regions of the side surfaces 5 and 6, respectively, of the component body 2. Alternatively, the input-output terminal electrodes 9 and 10 may be formed on the end surfaces 7 and 8, respectively, of the component body 2, and the ground terminal electrodes 11 and 12 may be formed on the central regions of the side surfaces 5 and 6, respectively, of the component body 2.

In the above-described modification, the ground terminal electrodes 11 and 12 may be integrated so that an integrated ground terminal electrode covers the side surfaces 5 and 6, and the main surfaces 3 and 4, of the component body 2.

The illustrated embodiments are related to the three-terminal CR composite component 1. The present invention is also applicable to a composite component including a resistive element and elements other than the resistive element. For this purpose, the insulating layers 13 may be composed of materials such as magnetic materials other than dielectrics, depending on the features of the elements. Patterns of the inner electrodes 14 and 15, for example, may also be changed, depending on the features of the elements.

The present invention is applicable to not only a three-terminal electronic component but also to, for example, a two-terminal electronic chip component such as a general monolithic ceramic capacitor.

In the illustrated preferred embodiments, both the resistive film 17 and the outer conductive film 18 are formed on the ground terminal electrodes 11 and 12, not on the input-output terminal electrodes 9 and 10 formed on the outer surfaces of the component body 2. Such an arrangement including both a resistive film and an outer conductive film may be applied to all or some of the terminal electrodes on an electronic chip component.

In the illustrated preferred embodiments, the resistive film 17 functioning as a resistor is a cured resin film including dispersed conductive particles. Such a cured resin film may be a good conductor like a general electrode. Even in this case, the cured resin film includes a curable resin and has a higher resistance than other conductive metallic bodies. Thus, conductive metallic particles dispersed on the resin film are favorable when the resin film is electroplated.

It should be understood that the foregoing description is only illustrative of the present invention. Various alternatives and modifications can be devised by those skilled in the art without departing from the present invention. Accordingly, the present invention is intended to embrace all such alternatives, modifications and variations that fall within the scope of the appended claims.

What is claimed is:

1. An electronic chip component comprising:
    a chip component body; and
    a plurality of terminal electrodes disposed on outer surfaces of the component body, at least one of the terminal electrodes including:
        a cured resin film including dispersed conductive particles and having an outer surface;
        an outer conductive film disposed on the cured resin film; and
        additional conductive metallic particles being dispersed on an interface between the cured resin film and the outer conductive film; wherein
        the outer conductive film is a plated film; and
        the plated film covers substantially the entire outer surface of the cured resin film.

2. The electronic chip component according to claim 1, wherein the cured resin film is a resistive film having a volume resistivity of about $5 \times 10^{-3}$ Ω·m or more.

3. The electronic chip component according to claim 2, wherein the electronic chip component is a capacitor-resistor composite component, and the component body includes a plurality of stacked insulating layers and at least one inner electrode pair including a first inner electrode and a second inner electrode disposed alternately, each of said inner electrodes being disposed between the two adjacent insulating layers and both of said inner electrodes opposing each other with one of the insulating layers therebetween to provide electrostatic capacitance, and the terminal electrodes include a first terminal electrode electrically connected to the first inner electrode and second terminal electrodes electrically connected to the second inner electrode.

4. The electronic chip component according to claim 3, wherein the electronic chip component is a three-terminal capacitor-resistor composite component, and the first terminal electrode is a ground terminal electrode, the second terminal electrodes are two input-output terminal electrodes, and the ground terminal electrode includes the resistive film and the outer conductive film.

5. The electronic chip component according to claim 2, wherein the terminal electrodes further include a substrate conductive film disposed between the outer surfaces of the component body and the resistive film.

6. The electronic chip component according to claim 1, wherein the chip component body has a multilayered structure including a plurality of insulating layers and electrode layers.

7. The electronic chip component according to claim 1, wherein the plurality of terminal electrodes includes at least one ground terminal electrode and the at least one of the terminal electrodes is the at least one ground terminal electrode.

8. The electronic chip component according to claim 1, wherein the additional conductive metallic particles dispersed on an interface between the cured resin film and the outer conductive film is other than the conductive particles in the cured resin film.

9. The electronic chip component according to claim 1, wherein the plurality of terminal electrodes include a pair of ground terminal electrodes disposed on opposite ends of the component body, each of the pair of ground terminal electrodes including:
    the cured resin film including dispersed conductive particles having an outer surface;
    the electroplated outer conductive film disposed on the cured resin film; and
    the additional conductive metallic particles being dispersed on an interface between the cured resin film and the outer conductive film; wherein
    the outer conductive film is a plated film; and
    the plated film covers substantially the entire outer surface of the cured resin film.

10. The electronic chip component according to claim 9, wherein the substrate conductive film includes nickel.

11. The electronic chip component according to claim 1, wherein the at least one of the terminal electrodes further comprises a substrate conductive film disposed on an outer surface of the component body and between the outer surface of the component body and the cured resin film.

12. The electronic chip component according to claim 1, wherein the conductive particles in the cured resin film include at least one of carbon, oxidized ruthenium, and tantalum nitride.

13. The electronic chip component according to claim 1, wherein the cured resin film include one of an epoxy resin, an acrylic resin, a melamine resin, a phenolic resin, a polyimide resin, a resol-type phenolic resin, an unsaturated polyester resin, a fluorocarbon resin, a silicone resin and an UV-curable resin.

14. The electronic chip component according to claim 1, wherein the additional conductive metallic particles include one of an oxidation-resistant material and a noble metal.

* * * * *